(12) United States Patent
Kumar et al.

(10) Patent No.: US 9,411,404 B2
(45) Date of Patent: Aug. 9, 2016

(54) COPROCESSOR DYNAMIC POWER GATING FOR ON-DIE LEAKAGE REDUCTION

(71) Applicant: Apple Inc., Cupertino, CA (US)

(72) Inventors: Rohit Kumar, Austin, TX (US); Suresh Periyacheri, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 294 days.

(21) Appl. No.: 14/157,171

(22) Filed: Jan. 16, 2014

(65) Prior Publication Data

US 2015/0198992 A1 Jul. 16, 2015

(51) Int. Cl.
G06F 1/32 (2006.01)
G06F 9/50 (2006.01)

(52) U.S. Cl.
CPC ............ G06F 1/3243 (2013.01); G06F 1/3293 (2013.01); G06F 9/5094 (2013.01); Y02B 60/121 (2013.01); Y02B 60/1239 (2013.01); Y02B 60/142 (2013.01)

(58) Field of Classification Search
CPC ... G06F 1/3203; G06F 1/3234; G06F 1/3243; G06F 1/3293
USPC .................................................. 713/320, 323
See application file for complete search history.

(56) References Cited

U.S. PATENT DOCUMENTS

| | | | |
|---|---|---|---|
| 7,114,086 B2 * | 9/2006 | Mizuyabu | G06F 1/3203 712/200 |
| 7,496,770 B2 | 2/2009 | Gupta | |
| 7,725,682 B2 * | 5/2010 | Gschwind | G06F 9/30101 712/43 |
| 8,145,932 B2 * | 3/2012 | Dawkins | G06F 1/3221 713/300 |
| 8,473,717 B2 * | 6/2013 | Hugosson | G06F 12/08 712/34 |
| 2007/0028078 A1 * | 2/2007 | Harris | G06F 9/3814 712/214 |
| 2007/0085583 A1 | 4/2007 | Zohar | |
| 2009/0204837 A1 | 8/2009 | Raval et al. | |
| 2013/0086395 A1 * | 4/2013 | Liu | G06F 9/5094 713/300 |
| 2014/0189312 A1 * | 7/2014 | Tan | G06F 9/30 712/214 |

OTHER PUBLICATIONS

ISLPED '04, "Microarchitectural Techniques for Power Gating of Execution Units", Zhigang Hu, et al., Aug. 9-11, 2004, pp. 32-37.
International Symposium on Low Power Electronics and Design 2009, "Dynamic Power Gating with Quality Guarantees", Anita Lungu, et al., Aug. 2009, pp. 1-6.
"A Design Approach for Fine-grained Run-Time Power Gating using Locally Extracted Sleep Signals", Kimiyoshi Usami, et al., 2006, pp. 1-7.

* cited by examiner

*Primary Examiner* — Chun Cao
(74) *Attorney, Agent, or Firm* — Meyertons, Hood, Kivlin, Kowert & Goetzel, P.C.

(57) ABSTRACT

An apparatus is disclosed for managing operational modes of a processor. The apparatus may include the processor which may include a coprocessor, an instruction queue, and a monitoring circuit for detecting instructions for the coprocessor in the instruction queue. The monitoring circuit may detect when the instruction queue holds no instructions for the coprocessor. If the instruction queue holds no instructions for the coprocessor, the coprocessor may be placed into a mode in which the coprocessor consumes less power. The monitoring circuit may detect an instruction for the coprocessor in the instruction queue. In response to the instruction for the coprocessor, the coprocessor may be placed into a mode in which the coprocessor may execute the instruction.

14 Claims, 4 Drawing Sheets

COPROCESSOR DYNAMIC POWER GATING FOR ON-DIE LEAKAGE REDUCTION

BACKGROUND

1. Technical Field

This invention is related to the field of integrated circuit implementation, and more particularly to the power management of coprocessors.

2. Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

In some SoC designs, processors included in the SoC may enter an inactive state upon completing certain computing tasks to reduce power consumption or to reduce the emission of electromagnetic interference (EMI). Coprocessors coupled to processors may similarly enter idle states to further conserve system power consumption or reduce EMI.

A voltage regulator may be used, in various SoCs, to maintain the voltage level of the power supply used throughout the SoC to prevent the voltage level from rising to a level, which may damage the circuits. Some voltage regulating systems may be capable of providing multiple voltage levels and outputs such that more than one power domain (i.e., one or more circuits coupled to the same supply voltage) may be created. Different functional blocks within the SoC may be connected to one of the multiple power domains, allowing for voltage levels across the SoC to be adjusted to match the requirement for the circuits in a particular power domain. For example, analog circuits, such as digital-to-analog converters, may be connected to an analog voltage domain to keep a steady voltage on these circuits while other voltage domains may vary voltage for power savings.

One issue with placing processors and coprocessors into low power or power-down modes is that such modes may create a delay when the circuits return to normal operation (also referred to herein as "waking up" or being "woke up") to resume execution. In some low power modes, a voltage level may be maintained that is sufficient to preserve the state of the circuits such that resuming operation may only require enough time for the power supply voltage level to rise back to a full operational level. Other power modes, such as a full power-down mode, may not preserve the state of the circuits and resuming operation may require enough time for the voltage supply to rise back to a full operational level and may require additional time for the circuits coming out of this mode to be re-initialized or configured for the next task the circuits are to perform.

SUMMARY OF THE EMBODIMENTS

Various embodiments of a coprocessor management system are disclosed. Broadly speaking, a system, an apparatus, and a method are contemplated in which the apparatus includes a coprocessor, an instruction queue, and a monitoring unit coupled to the coprocessor and to the instruction queue. The monitoring unit may be configured to switch the coprocessor from operating in a first power mode to operate in a second power mode after determining the instruction queue holds no instructions for the coprocessor. The monitoring unit may switch the coprocessor to operate in the first power mode upon determining that the instruction queue includes at least one instruction to be executed by the coprocessor.

In another embodiment of the apparatus, the system monitor unit may be further configured to wait to switch the coprocessor from operating in the first power mode to operating in the second power mode until the instruction queue has no instructions to be executed by the coprocessor for a first predetermined amount of time.

In a further embodiment, the system monitor unit may be further configured to switch the coprocessor from the second power mode into a third power mode upon determining that the instruction queue includes no instructions to be executed by the coprocessor for a second predetermined amount of time.

In one embodiment, to switch the coprocessor from the first power mode to the second power mode, the monitoring unit may set a voltage level of a power supply coupled to the coprocessor to a lower voltage level.

In another embodiment, a first power supply may be coupled to a first set of functional blocks in the coprocessor and a second power supply may be coupled to a second set of functional blocks included in the coprocessor. In a further embodiment, the first power supply may be configured to reduce a voltage level of the first set of functional blocks upon the coprocessor switching to operate in the second power mode and increase the voltage level of the first set of functional blocks upon the instruction queue including at least one instruction to be executed by the coprocessor. The second power supply may configured to reduce a voltage level of the second set of functional blocks upon the coprocessor switching to operate in the second power mode and increase the voltage level of the second set of functional blocks upon the instruction queue including at least one instruction to be executed by the coprocessor.

BRIEF DESCRIPTION OF THE DRAWINGS

The following detailed description makes reference to the accompanying drawings, which are now briefly described.

Figure 1:
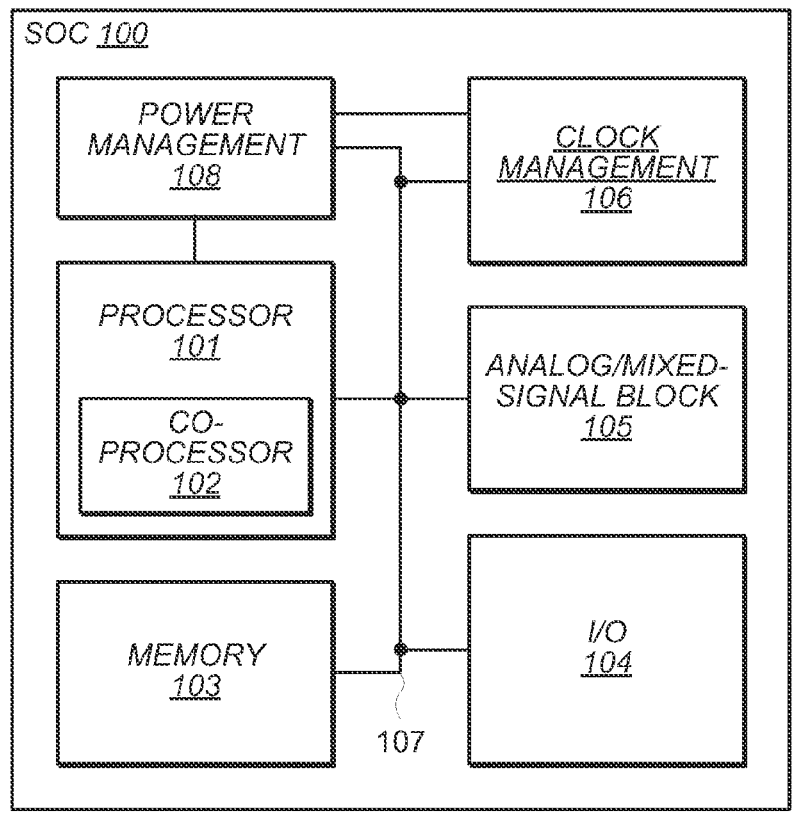
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system-on-a-chip (SoC) may include one or more functional blocks, such as, e.g., a processor, which may integrate the function of a computing system onto a single integrated circuit. To reduce power consumption in some SoC designs, processors included in the SoC may enter an inactive, idle state upon completing certain computing tasks. While in an idle state, a processor may not be executing instructions, or there may be a lack of activity in one or more coprocessors such as, for example, an Arithmetic Logic Unit (ALU) or a Floating-Point Unit (FPU), included in the processor. When a processor is in an idle state, one or more blocks within the processor, such as, e.g., a coprocessor, may be placed in a low power mode which may reduce power consumption by configuring circuits internal to the blocks to reduce both active currents and leakage currents. For example, clock signals may be blocked from the circuits to prevent unnecessary switching current while the coprocessor waits for a next instruction. Alternatively, a voltage level of a power supply coupled to a block may be reduced upon switching to a low power mode.

When a block within a processor, such as, e.g., a coprocessor, transitions from a power down mode or a low power mode to an active mode (also referred to herein as "waking up" or "awakening" the coprocessor), the transition may require an amount of time before the block is ready to resume operation thereby creating a delay before the block may start a task that it has been selected to perform. In addition to the time delay, the power consumption may be greater during this mode transition time as voltage levels within the block return to typical operating levels. Therefore, it may be desirable to limit a block from entering a low power mode unless the block will be in the low power mode long enough such that the power savings from being in the low power mode is greater than the power consumed during entry to and exit from the low power mode. The embodiments illustrated in the drawings and described below may provide techniques for managing power modes within a processor that may allow for lower overall power consumption and may limit any performance impact while a portion of the processor is in a reduced power mode.

System-on-a-Chip Overview

A block diagram of an embodiment of an SoC is illustrated in FIG. 1. In the illustrated embodiment, the SoC 100 includes a processor 101 including a coprocessor 102 and coupled to memory block 103, I/O block 104, analog/mixed-signal block 105, clock management unit 106, and power management unit 108, all coupled through bus 107. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores. In some embodiments, processor 101 may include one or more register files and memories.

In some embodiments, processor 101 may implement any suitable instruction set architecture (ISA), such as, e.g., PowerPC™, or x86 ISAs, or combination thereof. The instruction set for processor 101 may include a number of machine code instructions that direct and control the operation of a given CPU core. Processor 101 may include one or more bus transceiver units that allow processor 101 to communication to other functional blocks within SoC 100 such as, power management unit 108, for example.

Coprocessor 102 may be any type of circuit that may supplement the capabilities of processor 101. Coprocessor 102 may be an arithmetic logic unit (ALU), a floating-point unit (FPU), a digital signal processor (DSP), a graphics processing unit (GPU), an encryption acceleration unit, or combinations thereof. Coprocessors may execute micro-operations to perform various tasks which may supplement tasks being performed by processor 101. A micro-operation (also referred to herein as "micro-op") may refer to a command from an instruction set that may be smaller or more specialized than the instruction set for processor 101. Micro-operations, when executed by a coprocessor, may perform a piece of a machine code instruction for processor 101. In some embodiments, coprocessor 102 may be a sub-module of processor 101. In other embodiments, coprocessor 102 may be coupled to processor 101 by system bus 107.

Memory 103 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or a Magneto-resistive Random Access Memory (MRAM), for example. Some embodiments may include a single memory, such as memory 103 and other embodiments may include two or more memory blocks (not shown) which may be the same type of memory or a mix of memory types. In some embodiments, memory 103 may be configured to store program instructions that may be executed by processor 101. Memory 103 may, in other embodiments, be configured to store data to be processed, such as graphics data, for example.

Input/Output (I/O) block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol, IEEE 1394 (Firewire®) protocol, or may allow for program code and/or program instructions to be transferred from a peripheral storage device for execution by processor 101. In one embodiment, I/O block 104 may be configured to perform the data processing necessary to implement an Ethernet (IEEE 802.3) networking standard.

Analog/mixed-signal block 105 may include a variety of circuits including, for example, a crystal oscillator, a phase-locked loop (PLL) or delay-locked loop (DLL), an analog-to-digital converter (ADC), and a digital-to-analog converter (DAC) (all not shown). In some embodiments, analog/mixed-signal block 105 may also include, in some embodiments, radio frequency (RF) circuits that may be configured for operation with cellular telephone networks. Analog/mixed-signal block 105 may include one or more voltage regulators to supply one or more voltages to various functional blocks and circuits within those blocks.

Clock management unit 106 may be configured to select one or more clock sources for the functional blocks in SoC 100. In various embodiments, the clock sources may be located in analog/mixed-signal block 105, in clock management unit 106, in other blocks with SoC 100, or come from external to SoC 100, coupled through an I/O pin. In some embodiments, clock management 106 may be capable of dividing a selected clock source before it is distributed throughout SoC 100.

System bus 107 may be configured as one or more buses to couple processor 101 to the other functional blocks within the SoC 100 such as, e.g., memory 103, and I/O block 104. In some embodiments, system bus 107 may include interfaces coupled to one or more of the functional blocks that allow a particular functional block to communicate through the bus. In some embodiments, system bus 107 may allow movement of data and transactions (i.e., requests and responses) between functional blocks without intervention from processor 101. For example, data received through the I/O block 104 may be stored directly to memory 103.

Power management unit 108 may be configured to manage power delivery to some or all of the functional blocks included in SoC 100. Power management unit 108 may include sub-blocks for managing multiple power supplies for various functional blocks. In various embodiments, the power supplies may be located in analog/mixed-signal block 105, in power management unit 108, in other blocks with SoC 100, or come from external to SoC 100, coupled through a power supply pin. Power management unit 108 may receive signals that indicate the operational state of one or more functional blocks. In response to the operational state of a functional block, power management unit may adjust the output of a power supply.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltage levels.

Coprocessor Management Within an SoC

Figure 2:
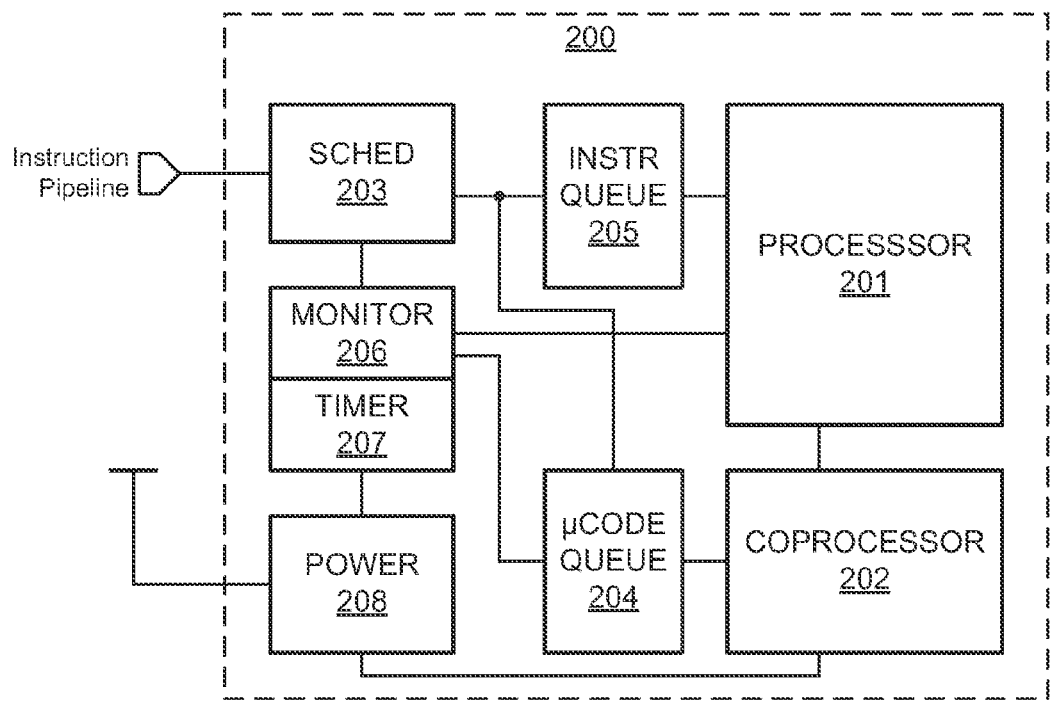
FIG. 2 illustrates an embodiment of a processor unit with power management functions.

Turning to FIG. 2, an embodiment of a processing unit with power management capabilities is illustrated. Processing unit 200 may, in some embodiments, correspond to processor 101 in FIG. 1. In the illustrated embodiment, processing unit 200 may include processor 201, coprocessor 202, scheduler 203, micro-operation queue 204, instruction queue 205, activity monitoring unit 206 (including timer circuit 207), and power switching circuit 208.

Processor 201 may, in some embodiments, execute program instructions that have been retrieved from memory and placed in instruction queue 205. In various embodiments, processor 201 may be coupled to coprocessor 202, activity monitoring unit 206, other functional blocks in SoC 100, or a combination thereof. Processor 201 may, in other embodiments, include multiple processing cores (not shown), each core configured to execute instructions from instruction queue 205.

Coprocessor 202 may, in some embodiments, correspond to coprocessor 102 in FIG. 1. Coprocessor 202 may be any type of coprocessing unit capable of supplementing the processing capabilities of processor 201. Although, in the illustrated embodiment, a single coprocessor is shown, in other embodiments, processing unit 200 may include more than one coprocessor. A coprocessor, such as coprocessor 202, may execute micro-operations instructions placed in micro-operation queue 204. Additionally, coprocessor 202 may also receive commands from processor 201. In various embodiments, the commands may be received in the form of control signals set by processor 201 or in the form of micro-operations either entered into micro-operation queue 204 or sent directly to coprocessor 202. Received commands may include configuration settings and operational mode settings, such as, e.g., commands to enter and exit one or more low power modes.

Scheduler 203 may assign machine code instructions to processor 201 and coprocessor 202 as instructions are received via an instruction pipeline. In some embodiments, scheduler 203 may generate one or more micro-operations to be executed by coprocessor 202 for a given machine code instruction. Scheduler 203 may place instructions into micro-operation queue 204 and instruction queue 205.

In some embodiments, scheduler 203 may assert a control signal to indicate that a micro-operation is about to be placed in micro-operation queue 204. The control signal may be coupled to processor 201. In some embodiments, in response to the assertion of the control signal, processor 201 may send a command to coprocessor 202 in order to configure coprocessor 202 for the upcoming instruction. One such command from processor 201 may be to awaken coprocessor 202 from a low power mode and resume normal operation.

Micro-operation queue 204 may include a set of one or more registers or a block of memory that may be configured to receive incoming micro-operations to be executed by coprocessor 202. In some embodiments, micro-op queue 204 may be a part of instruction queue 205, while in other embodiments, micro-op queue 204 may be separate. Micro-op queue 204 may act as a First-In, First-Out (FIFO) buffer or pipeline in which micro-operations are executed by coprocessor 202 in the order they are received. In other embodiments, micro-op queue 204 may allow re-ordering of instructions by scheduler 203 or processor 201. When micro-op queue 204 is full, it may assert a signal to scheduler 203 which may cause scheduler 203 to cease adding micro-operations until space is available in the queue. When micro-op queue 204 is empty, i.e., no instructions are pending execution by coprocessor 202, then micro-op queue 204 may assert a signal to alert monitoring unit 206, scheduler 203 or processor 201. In cases when no instructions are pending in micro-op queue 204, coprocessor 202 may enter an idle state where it may wait for an incoming instruction to execute.

Instruction queue 205 may receive program instructions to be executed by processor 201. In various embodiments, instruction queue 205 may include a FIFO buffer for saving instructions to be executed in the order they were received, or may allow for re-ordering of instructions by scheduler 203. Instruction queue 205 may assert signals to scheduler 203 when the queue is empty or full.

Monitoring unit 206 may include circuits for monitoring micro-op queue 204 to determine if the queue is empty and controlling operational modes of coprocessor 202. In various embodiments, the determination that micro-op queue 204 is empty may be accomplished by receiving a signal from micro-op queue 204 when the queue is empty or may be accomplished by maintaining a count of micro-operations as they are added into the queue by scheduler 203 or removed from the queue by coprocessor 202 for execution. Monitoring unit 206 may assert a signal when the last micro-operation is removed from micro-op queue 204. In various embodiments, the asserted signal may remain asserted as long as micro-op queue 204 is empty, assert for only a period of time or assert until acknowledged by another circuit in SoC 100.

Monitoring unit 206 may include timer circuit 207 to determine how long micro-op queue 204 has been empty. In some embodiments, the timer circuit may be a counter that may increment up to a predetermined value from zero or may decrement from a predetermined value to zero. Upon reaching the final value, the counter may assert a signal to indicate a time period has expired. In other embodiments, timer circuit 207 may be a resistor-capacitor network that may be pre-charged to a predetermined voltage and then allowed to decay to a nominal voltage. Upon reaching the nominal voltage, a signal may be asserted to indicate a time period has expired. Other forms of timer circuits are known and may be used in place of the disclosed circuits. Monitoring unit 206 may use timer circuit 207 to determine if micro-op queue 204 has been empty for a predetermined amount of time. Monitoring unit 206 may assert one or more signals to indicate one or more time periods in which micro-op queue 204 has remained empty. Although only one timer circuit is depicted in the embodiment illustrated in FIG. 2, in other embodiments, multiple timer circuits tracking multiple time periods may be employed.

Power switching circuit 208 may control a voltage level of one or more power supplies coupled to coprocessor 202. In various embodiments, power switching circuit 208 may switch between two or more voltage levels entering processor 201 or power switching circuit 208 may receive a single voltage level as an input and produce an output with a reduced voltage level. In further embodiments, power switching circuit 208 may include a switch to decouple a power supply from coprocessor 202. Power switching circuit 208 may receive the signal from monitoring unit 206 that indicates that micro-op queue 204 is empty. In response to receiving the empty signal, power switching circuit 208 may reduce the voltage level to coprocessor 202. Power switching circuit 208 may also be configurable to decouple or reduce a voltage level of a power supply output to micro-op queue 204.

It is noted that the embodiment of a processing unit 200 as illustrated in FIG. 2 is merely an example. The numbers and types of functional blocks may differ in various embodiments.

Figure 3:
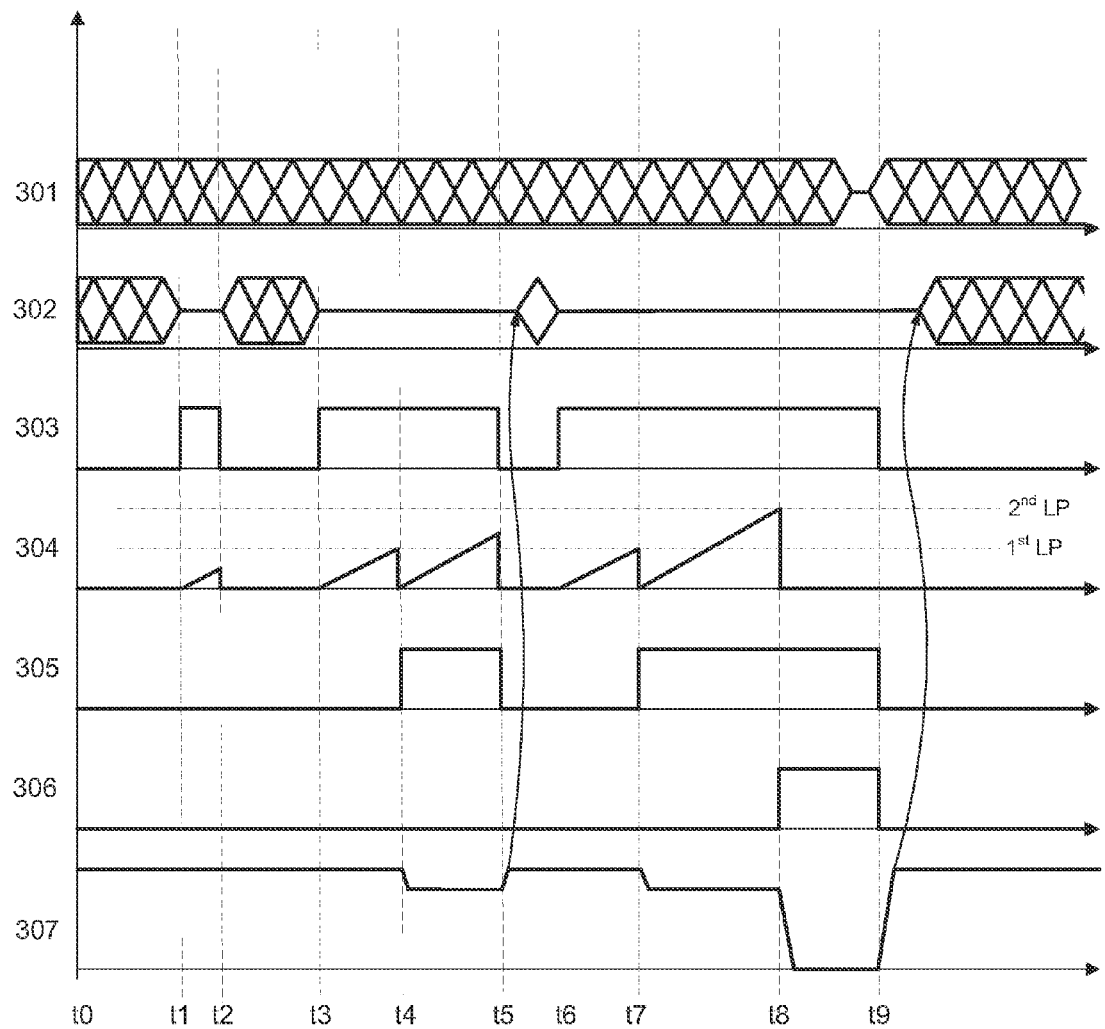
FIG. 3 illustrates possible waveforms of an embodiment of a processor unit with power management functions.

Turning to FIG. 3, example waveforms that may illustrate the operation of a processing unit with power management capabilities, such as, e.g., processing unit 200 as depicted in FIG. 2, are illustrated. Referring collectively to the waveforms of FIG. 3 and the embodiment of FIG. 2, waveform 301 may show the activity of processor 201 versus time. Waveform 302 may show the activity of coprocessor 202. In waveforms 301 and 302, a diamond pattern may indicate an active state and a single straight line may indicate an idle state. A queue empty signal, as asserted by monitoring unit 206, may be shown in waveform 303. A count of how long a queue, such as, e.g., micro-op queue 204, has been empty may be represented by waveform 304. Waveform 305 may indicate when coprocessor 202 is in a first low power mode. An indication that coprocessor 202 is in a second low power mode may be presented in waveform 306. And finally, waveform 307 may represent the voltage level of the power supply to coprocessor 202.

In this example, at time t0, processor 201 and coprocessor 202 may both be active, such that both instruction queue 205 and micro-op queue 204 and not empty. Since micro-op queue 204 is not empty, the queue empty signal in waveform 303 may be low and the count value in waveform 304 may remain at zero. Waveforms 305 and 306 may remain low to indicate no low power modes are currently active. Waveform 307 may represent the coprocessor's voltage supply at a normal operational voltage level.

The micro-op queue may become empty and coprocessor 202 may be idle at time t1 as may be shown by waveform 302. Monitoring unit 206 may assert a signal to indicate the queue is empty (waveform 303). The timer circuit 207 may begin to increment a count value in waveform 304. In other embodiments, two timer circuits may be utilized, a first timer circuit to count to the first predetermined value and a second timer circuit to count to the second predetermined value. Waveforms 305, 306 and 307 may remain unchanged until the count value reaches one or more predetermined values.

At time t2, micro-op queue 204 may no longer remain empty and coprocessor 202 may be active. Monitoring unit 206 may de-assert the micro-op queue empty signal in waveform 303 and timer circuit 207 may clear the count value in waveform 304. Waveforms 305, 306, and 307 may again remain unchanged.

At time t3, micro-op queue 204 may again be empty and coprocessor 202 may be idle as waveform 302 may show. As at time t1, monitoring unit 206 may assert the queue empty signal and timer circuit 207 may again begin incrementing the count.

Timer circuit 207 may reach a first predetermined value at time t4 as waveform 304 may show. In response to timer circuit 207 reaching the first predetermined value, monitoring unit 206 may assert a signal to initiate a first low power mode as waveform 305 may show. In some embodiments, processor 201 may receive the first low power mode signal from monitoring unit 206 and may instruct coprocessor 202 to enter a first low power mode. In other embodiments, other circuits may instruct coprocessor 202 to enter the first low power mode. Power switching circuit 208 may be instructed to reduce the voltage level to coprocessor 202 to a first lower level as waveform 307 may show. Timer circuit 207 may reset and begin counting to a second predetermined value after reaching the first predetermined value. In other embodiments, timer circuit 207 may continue incrementing to the second predetermined value.

At time t5, micro-op queue 204 may no longer remain empty due to a received micro-op intended to be executed by coprocessor 202. Monitoring unit 206 may de-assert the micro-op queue empty signal in waveform 303 and timer circuit 207 may clear the count value in waveform 304. Monitoring unit 206 may de-assert the first low power mode signal as may be shown in waveform 305, and in response, coprocessor 202 may be awoken from the first low power mode. Waveform 306 may remain unchanged, as the second low power mode was never initiated. Coprocessor 202 may have some latency before reaching a fully active state. This latency may be shown in waveform 302 by the gap from t5 to the active state and in waveform 307 by the rise time that may result on voltage input to coprocessor 202 as the voltage level rises back to the normal operating level. In some embodiments, the voltage level to the coprocessor 202 may be chosen such that the voltage rises to the normal operating level quickly and the latency is negligible and creates little to no delay for operations executing within processing unit 200.

Micro-op queue 204 may again be empty and coprocessor 202 may be idle at time t3, as waveform 302 may indicate. As at times t1 and t3, monitoring unit 206 may assert the queue empty signal and timer circuit 207 may again begin incrementing the count.

At time t7, timer circuit 207 may again reach the first predetermined value. Monitoring unit 206 may again assert the signal to initiate the first low power mode which coprocessor 202 may again enter. Timer circuit 207 may again count towards the second predetermined value. Power switching circuit 208 may reduce the coprocessor's voltage level to the first lower level.

Timer circuit 207 may reach the second predetermined value at time t8, as may be indicated by waveform 304. Monitoring unit 206 may assert a signal to initiate a second low power mode as may be shown in waveform 306. Monitoring unit 206 may also continue to assert the first low power mode signal as waveform 305 may indicate, or in other embodiments, may de-assert the first low power mode signal. Coprocessor 202 may be instructed to enter a second low power mode, such that when operating in the second lower power mode, coprocessor 202 may consume less power than when operating in the first low power mode. Power switching circuit 208 may reduce the voltage level to coprocessor 202 to a second voltage level, which may be lower than the first voltage level. In some embodiments, the second low power mode may be a full power-down mode and the second voltage level may be at or near ground potential, i.e., zero volts, as depicted in waveform 307.

The first and second predetermined values may be determined during the design of SoC 100. In other embodiments, the first and second predetermined values may be set by processor 201, coprocessor 202 or another processor in SoC 100. The predetermined values may be set based on a variety of criteria, such as the amount of time coprocessor 202 requires to wake up from each low power mode and how much current is consumed by coprocessor 202 while it wakes up from each low power mode. Other criteria for setting the first and second values may include software applications, which may be executed by one or more processors within a computing system, such as, e.g., SoC 100. For example, if the coprocessor is a graphics coprocessor and an application with high graphical content is running, then the predetermined times may be set for longer times such that the graphics coprocessor does not frequently alternate between low power and active modes.

It is noted, that processor 201 may remain active after coprocessor 202 enters the second low power mode. This may be true even if the second low power mode is a full power-down mode. A brief idle period is shown in waveform 301 to indicate that, in some embodiments, processor 201 may be able to enter a low power mode while coprocessor 202 is already in the first or second low power mode. In other embodiments, processor 201 may remain active for the entire time coprocessor 202 is in a low power mode.

At time t9, micro-op queue 204 may no longer remain empty as a micro-op for coprocessor 202 may have been received. Monitoring unit 206 may de-assert the micro-op queue empty signal in waveform 303. Monitoring unit 206 may de-assert the first low power mode signal and the second low power mode signal as may be shown in waveforms 305 and 306. In response, coprocessor 202 may be awoken from the second low power mode. Coprocessor 202 may have some latency before reaching a fully active state. This latency may be shown in waveform 302 by the gap from t9 to the active state and in waveform 307 by the rise time that may result on power switching circuit 208 as the voltage level rises back to the normal operating level. In some embodiments, the voltage supply to the coprocessor 202 may be designed such that the voltage rises to the normal operating level quickly and the latency is minimized and creates a minimal delay for operations executing within processing unit 200. In certain embodiments, the voltage level may recover and coprocessor 202 may be active before the received micro-op is ready for execution. It is noted, however, that the latency from the second low power mode to the normal operating mode may be longer than from the first low power mode to normal operating mode.

It is noted that FIG. 3 is merely an example of possible waveforms illustrated for demonstration purposes. Actual waveforms may vary due to specific circuit embodiments, technology used to create the circuits and other factors in the operation of the system.

Figure 4:
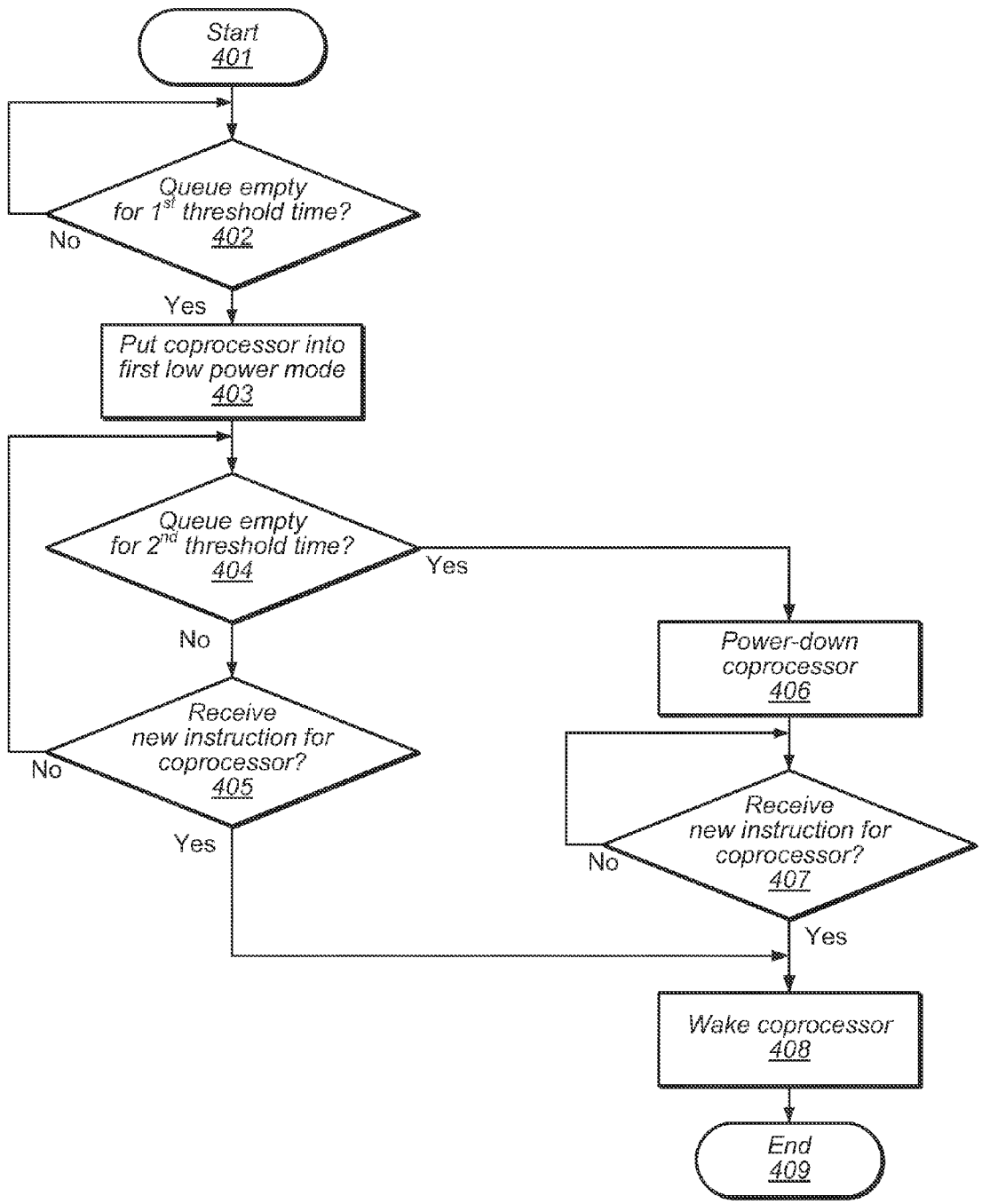
FIG. 4 illustrates a flowchart of an embodiment of a method for managing power modes in a processor unit.

Turning to FIG. 4, a method is illustrated for managing an operational mode of a coprocessor in a processing unit, such as, e.g., processing unit 200 in FIG. 2. Referring collectively to processing unit 200, and the flowchart in FIG. 4, the method may begin in block 401 with a queue, such as, e.g., micro-op queue 204, containing micro-operations for coprocessor 202. As coprocessor 202 removes instructions from the queue for execution, the queue may be checked to see if it is empty.

In other embodiments, an instruction queue, such as, e.g., instruction queue 205, may receive instructions for both processor 201 and coprocessor 202. Instructions received by instruction queue 205 may include micro-ops for coprocessor 202 which may be parsed into micro-op queue 204. Instruction queue 205 may be monitored for the presence of instructions containing micro-operations for coprocessor 202 rather than micro-op queue 204. In such embodiments, the instruction queue may be considered "empty" if no micro-ops are detected for coprocessor 202, although the instruction queue may still include instructions for processor 201 or another coprocessor included in the processor or elsewhere within a computing system including the processor.

The method may then depend on the operations in micro-op queue 204 (block 402). Micro-op queue 204 may have internal circuits to indicate the queue is empty or in other embodiments, an external circuit, such as, for example, monitoring unit 206, may monitor micro-operations being added and removed from the queue. Monitoring unit 206 may also be coupled to timer circuit 207 to determine if micro-op queue 204 has been empty for a first predetermined period of time. If the micro-op queue 204 has been empty for a predetermined first period of time, then status of the queue may continued to be checked (block 402).

The length of the first predetermined period of time may, in some embodiments, be fixed during design or may be configurable during operation of an SoC such as, e.g., SoC 100. In various embodiments, a configurable period of time may be set based on collected metrics such as, e.g., how long coprocessor 202 typically remains idle, or based on what software applications are currently being retrieved from memory and executed, or based on a currently selected system power management profile, or based on a combination of these and other criteria.

If micro-op queue 204 has been empty for a predetermined first amount of time, then coprocessor 202 may be put into a first low power mode (block 403). The first low power mode may maintain values in some or all registers associated with coprocessor 202. By maintain register values, coprocessor 202 may be able to wake up from the first low power mode and execute an incoming micro-operations with minimum latency. In some embodiments, power switching circuit 208 may lower the voltage level supplied to coprocessor 202, while coprocessor 202 is in the first low power mode.

The method may then depend on how long micro-op queue has remained empty since entering the first low power mode (block 404). After reaching the first predetermined time period, timer circuit 207 may be used by monitoring unit 206 to determine if micro-op queue has remained empty for a second predetermined period of time. In other embodiments, a second timer circuit may be used to establish the second predetermined period of time. The second predetermined period of time, like the first predetermined period of time, may be a fixed value, set during design, or may, in some embodiments, be configurable during operation of a computing system, such as, e.g., SoC 100. A configurable second time period may be set using criteria similar to those disclosed for the first predetermined time period. If micro-op queue 204 has remained empty for a second predetermined period of time, then coprocessor 202 may enter a second low power mode in block 406. Power consumed by coprocessor 202 operating in the second low power mode may, in some embodiments, be less than power consumed by coprocessor 202 while operating in the first low power mode.

The method may then depend on the state of micro-op queue 204 (block 405). In some embodiments, a determination may be made if new operations have been added to micro-op queue 204. Scheduler 203 may have a new micro-operation to add to micro-op queue 204 responsive to instructions in instruction queue 205. In some embodiments, scheduler 203 may not add the new instruction to the queue until coprocessor 202 has exited the first low power mode. In other embodiments, scheduler 203 may send the new instruction to micro-op queue 204 while coprocessor 202 is being awoken from the first low power mode. If a new instruction is ready to be added to micro-op queue 204, or has been detected in micro-op queue 204, the coprocessor may then be awoke (block 408). When no operations have been added to micro-op queue 204, the method may then depend on how long micro-op queue has remained empty since entering the first low power mode (block 404).

If the second time period elapses without a operation having been added to micro-op queue 204, then coprocessor 202 may be placed into a second low power mode (block 406) as described above. In some embodiments, the second low power mode may retain some registers and states in coprocessor 202 such that coprocessor 202 may be awoken with less latency than if a power down mode was entered. In some embodiments, power switching circuit 208 may decouple coprocessor 202 from a power supply, or set a voltage level of a power supply to coprocessor 202 to a voltage level at or near ground potential.

It is noted that, in some embodiments, processor 201 may remain active while coprocessor is in the first or second low power mode. It the second low power mode is a power down mode, processor 201 may still remain active, executing operations for which coprocessor 202 is not required.

The method may then depend on the state of micro-op queue 204 (block 407) in a similar fashion to block 405. When no operations have been added to micro-op queue 204, the state of micro-op queue 204 may continued to be checked (block 407).

When an operation has been added to micro-op queue 204, the coprocessor may return to operation mode or "wake up" (block 408). If power switching circuit 208 has reduced the voltage level to coprocessor 202, then power switching circuit 208 may restore the voltage level to a normal operating voltage level. In various embodiments, there may be a latency associated with the voltage level rising back to the normal operating level. Coprocessor 202 may not be awoken from the low power state until the voltage level is high enough to support operation of coprocessor 202. In some embodiments, coprocessor 202 may not be awoken until the voltage level is at the normal operating level, while in other embodiments, coprocessor 202 may be awoken once the voltage level exceeds a minimal operational level. In one embodiment, coprocessor 202 may be able to wake and execute the new micro-operation within a time period that results in no delay to the operation of processor 201.

In various embodiments, coprocessor 202 may include multiple functional blocks as described below in more detail. Different groups of functional blocks within coprocessor 202 may be coupled to respective power supplies. When coprocessor 202 is awakened, power may be returned to the different groups of functional blocks in a sequential fashion. In some embodiments, the sequential activation of differing groups of functional blocks within coprocessor 202 may allow for reduced latency in returning coprocessor 202 to a state where it is ready to execute operations.

In some embodiments, once coprocessor 202 is awake, associated registers may require initialization before the new instruction in micro-op queue 204 may be executed, resulting in a further latency. When coprocessor 202 awakes from the first low power mode, register values may have been preserved and this latency may be avoided. When the coprocessor 202 awakes from the second low power mode, some or all registers may be reset and the latency may not be avoided. Once coprocessor 202 is operational, the method may then conclude block 409.

It is noted that the method illustrated in FIG. 4 is merely an example embodiment. Although the method illustrated in FIG. 4 depicts operations being performed in series, in other embodiments, some or all of the operations may be performed in parallel or in a different sequence.

Power Management for Coprocessor

Figure 5:
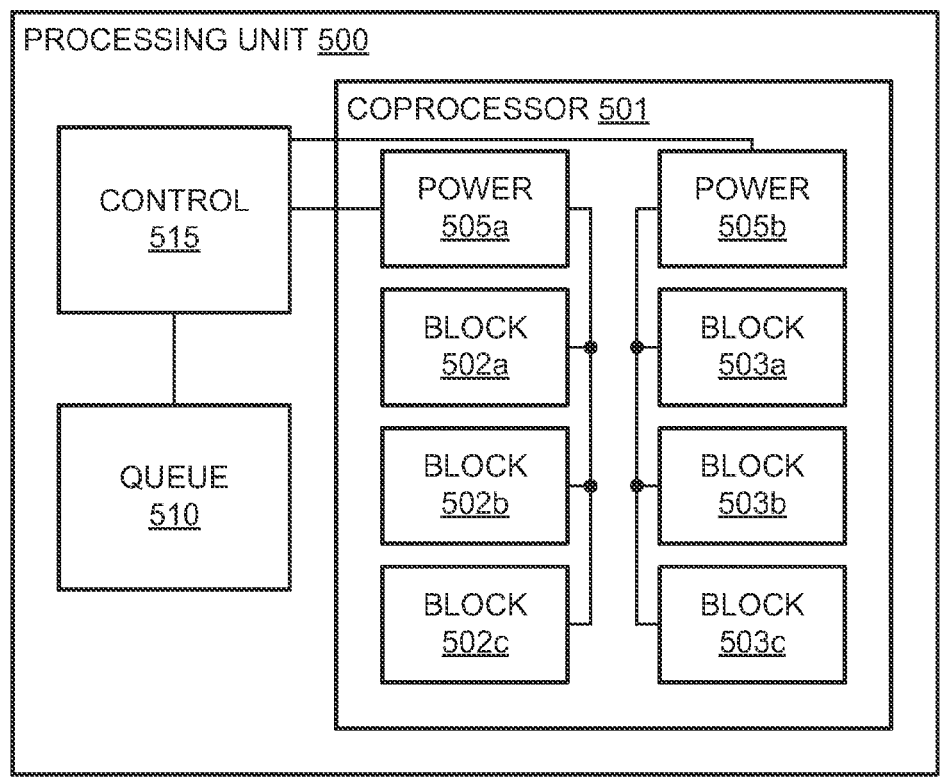
FIG. 5 illustrates a block diagram of a coprocessor with power switches.

Moving to FIG. 5, a block diagram for another embodiment of a processing unit is illustrated. Processing unit 500 may correspond to an embodiment of processor 101 in FIG. 1. Processing unit 500 includes coprocessor 501, instruction queue 510, and control logic 515 coupled to coprocessor 501 and coupled to instruction queue 510.

Coprocessor 501 may correspond to coprocessor 102 in FIG. 1. Coprocessor 501 may be any type of coprocessing unit capable of supplementing the processing capabilities of processor 101. In some embodiments, processing unit 500 may include more than one coprocessor. Coprocessor 501 may execute, in whole or in part, instructions placed in queue 510. Coprocessor 501 may also receive commands from control logic 515. In various embodiments, the commands may be received in the form of control signals set by control logic 515 or in the form of micro-operations either entered into instruction queue 510 or sent directly to coprocessor 501. Received commands may include configuration settings and operational mode settings, such as, for example, commands to enter and exit one or more low power modes.

Coprocessor 501 may include functional blocks 502a-502c and functional blocks 503a-503c. These functional blocks may perform various functions for coprocessor 501 such as, for example, various math functions, temporary storage registers, and state machines for managing the execution of instructions. Functional blocks 502a-502c may be coupled to power switch 505a and functional blocks 503a-503c may be coupled to power switch 505b. In other embodiments, each power switch may be coupled to more or fewer than three functional blocks and each power switch may be coupled to a different number of functional blocks.

Power switches 505a-505b may control voltage levels of supply voltages provided to functional blocks 502a-502c and functional blocks 503a-503c respectively. Power switches 505a-505b may switch between two or more available voltage levels or may receive one voltage level and shift output voltages provided to the functional blocks to suitable voltage levels. In some embodiments, power switches 505a-505b may power-down functional blocks 502a-502c and functional blocks 503a-503c by reducing the voltage levels of the supply voltages to ground. Functional blocks 502a-502c may receive the supply voltage from power switch 505a in parallel, such that blocks 502a-502c power on and off in unison. Power switch 505b and functional blocks 503a-503c may behave similarly. However, power switch 505a and power switch 505b may operate independently from each other. By changing voltage levels for multiple functional blocks in unison, voltage level changes may be made more quickly than if each function block were to receive voltage level changes in series as may be done in other embodiments.

Power switches 505a-505b may receive commands from control logic 515 to set the voltage level of the supply voltage. In some embodiments, control logic 515 may command both power switch 505a and power switch 505b to change the voltage levels of the supply voltages in parallel. In other embodiments, power switch 505a and power switch 505b may be configured to change the voltage levels of the supply voltages in series. In some embodiments, a delay may be introduced between each change of the voltage levels to allow for a power supply to react to the new voltage level before the voltage level is changed for a next set of functional blocks. By using a delay between changing power switch 505a and power switch 505b, some embodiments may return to an operational voltage level faster than if both power switches are changed simultaneously.

It is noted that the embodiment of a processing unit 500 as illustrated in FIG. 5 is merely an example. The numbers and types of functional blocks may differ in various embodiments. For instance, more than two power switches may be included for a coprocessor in other embodiments. Also, each power switch may more or fewer functional blocks than the three shown.

Coprocessor Management System

Figure 6:
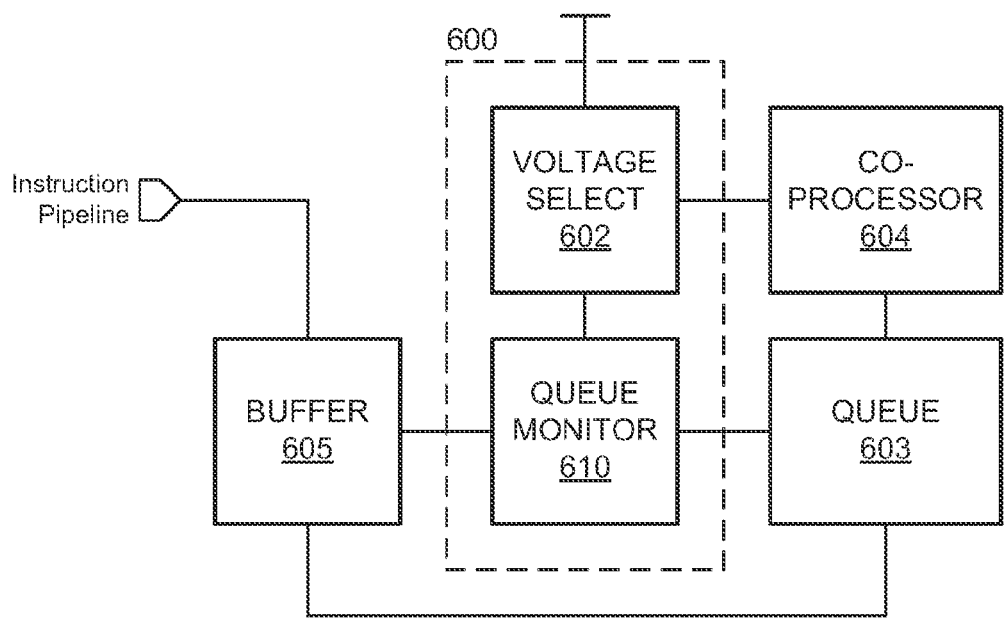
FIG. 6 illustrates an embodiment of a system with coprocessor management functions.

Turning to FIG. 6, an embodiment of a coprocessor management unit is illustrated. Coprocessor management unit 600 may represent another circuit for managing the operating modes of a coprocessor based on the activity of the coprocessor. Coprocessor management unit 600 may include queue monitor 610 and voltage selector 602, and may be coupled to instruction queue 603, coprocessor 604 and buffer 605.

Voltage selector 602 may control a voltage level for a power supply coupled to coprocessor 604. In some embodiments, voltage selector 602 may receive a voltage input from a system power supply and output a voltage at an equal or lower level than the input voltage. In other embodiments, voltage selector 602 may receive multiple voltage inputs, each at a different voltage level, and output a selected one of the voltages.

Instruction queue 603 may include a set of one or more registers or a block of memory that may receive incoming instructions to be executed by coprocessor 604. Instruction queue 603 may act as a FIFO buffer or pipeline in which instructions are held until executed by coprocessor 604. When instruction queue 603 is full, it may assert a first signal. When instruction queue 603 is empty, i.e., no instructions are pending execution by coprocessor 604, then instruction queue 603 may assert a second signal.

Coprocessor 604 may be any type of coprocessing unit capable of supplementing the processing capabilities of a host processor. Coprocessor 604 may execute instructions placed in instruction queue 603. When instruction queue is empty, coprocessor 604 may enter an idle state where it may wait for an incoming instruction to execute.

Buffer 605 may hold instructions for coprocessor 604 until they can be stored in instruction queue 603. Buffer 605 may hold only a single instruction at a time. In other embodiments, buffer 605 may hold only a first word of an instruction at a time or may hold more than one instruction at a time. Buffer 605 may assert a signal in response to receiving an instruction for coprocessor 604.

Queue monitor 610 may monitor the status of instruction queue 603 and buffer 605. The status may indicate if instruction queue 603 and buffer 605 are full or empty or partially full. Queue monitor 610 may receive signals from instruction queue 603 and buffer 605 to indicate their respective status. In other embodiments, queue monitor 610 may sense the state of instruction queue 603 or buffer 605. Responsive to determining instruction queue 603 has transitioned to an empty state, queue monitor 610 may initiate a countdown for a first time period. If instruction queue 603 has remained empty during the first time period, queue monitor 610 may instruct coprocessor 604 to enter a first low power state. In addition, queue monitor 610 may instruct voltage selector 602 to switch to a first lower voltage output level once coprocessor 604 has entered the first low power mode. In other embodiments, the voltage may not be changed. In the first low power state, coprocessor 604 may retain some or all register values and operating states such that coprocessor 604 does not require initialization when waking back to an operational mode.

The countdown may be performed by a circuit within queue monitor 610 or coupled to queue monitor 610. In some embodiments, the circuit may be a digital timer or counter circuit configured to increment or decrement in response to a periodic input signal, such as, for example, a system clock signal. In other embodiments, the circuit may be an analog circuit that is pre-charged (or discharged) to a known state and then discharges (or charges) to another known point in a predictable period of time.

In response to instructing coprocessor 604 to enter a first low power mode, queue monitor 610 may initiate another countdown for a second time period. If instruction queue 603 remains empty during the second time period, queue monitor 610 may instruct coprocessor 604 to enter a second low power state. In addition, queue monitor 610 may instruct voltage selector 602 to switch to a second low voltage output level. In other embodiments, the voltage may not be changed. In the second low power mode, some or all registers and operational states may not be preserved. In such a case, coprocessor 604 may require an initialization upon waking to an operational mode. In some embodiments, queue monitor 610 may instruct coprocessor 604 to enter a power-down state if instruction queue 603 remains empty for the second time period and the second low voltage output level may be at or near ground potential, i.e., zero volts.

Buffer 605 may receive an instruction for coprocessor 604 while coprocessor 604 is in either the first or second low power mode. In response to receiving the instruction, buffer 605 may assert a signal to indicate an instruction for coprocessor 604 has been received. Queue monitor 610 may receive the signal and in response instruct voltage selector 602 to increase the voltage level being provided to coprocessor 604. Queue monitor 610 may wait until the voltage output level from voltage selector 602 has reached a target level and then wake coprocessor 604 from the low power mode. In some embodiments, the target voltage level may be a normal operating voltage level for coprocessor 604. In other embodiments, the target level may be a minimum threshold voltage level which provides enough power to coprocessor 604 such that coprocessor 604 may wake from the low power mode. Upon awakening, coprocessor 604 may require an initialization before executing instructions from instruction queue 603. In some embodiments, one or more instructions from buffer 605 may be sent to instruction queue 603 while coprocessor 604 is waking from the low power mode. In other embodiments, buffer 605 may wait for a signal from instruction queue 603 or coprocessor 604 that coprocessor 604 is operational and ready to execute instructions before sending the received instruction to instruction queue 603.

It is noted that queue monitor 610 may be designed to monitor more than one coprocessor at a time. In various embodiments, multiple coprocessors with a suitable number of instruction queues, buffers, and voltage selectors may be monitored by one queue monitor. It is also noted that queue monitor 610 may be implemented as a sequential logic circuit or "state machine" designed for the functions disclosed above. In other embodiments, queue monitor 610 may be a general purpose core executing instructions which cause the core to perform the functions disclosed above.

The embodiment of FIG. 6 is merely an example embodiment of a coprocessor management unit. In various embodiments, different combinations of functional blocks may be included. In some embodiments, more than one coprocessor may be controlled by coprocessor management unit 600.

Numerous variations and modifications will become apparent to those skilled in the art once the above disclosure is fully appreciated. It is intended that the following claims be interpreted to embrace all such variations and modifications.

What is claimed is:

1. A system, comprising:
   a memory configured to store program instructions;
   a processor including a coprocessor and an instruction queue, wherein the instruction queue is configured to store program instructions retrieved from the memory;
   an activity monitoring unit configured to:
      switch the coprocessor from operating in a first power mode to operate in a second power mode responsive a determination that the instruction queue includes no instructions to be executed by the coprocessor;
      wherein power consumed by the coprocessor when operating in the second power mode is less than power consumed by the coprocessor when operating in the first power mode; and
      switch the coprocessor to operate in the first power mode responsive to a determination that the instruction queue includes at least one instruction to be executed by the coprocessor, wherein:
   to switch the coprocessor from operating in the first power mode to operate in the second power mode, the activity monitoring unit is further configured to switch the coprocessor to operate in the second power mode responsive to a determination that the instruction queue includes no instructions to be executed by the coprocessor for a first predetermined amount of time; and
   the activity monitoring unit is further configured to switch the coprocessor from operating in the second power mode to operate in a third power mode responsive to a determination that the instruction queue includes no instructions to be executed by the coprocessor for a second predetermined period of time, wherein the second predetermined amount of time is longer than the first predetermined amount of time, and wherein power consumed by the coprocessor when operating in the third power mode is less than power consumed by the coprocessor when operating in the second power mode.

2. The system of claim 1, wherein to switch the coprocessor from operating in the first power mode to operate in the second power mode, the activity monitoring unit is further configured to decrease a voltage level of a power supply coupled to the coprocessor.

3. A system comprising:
   a memory configured to store program instructions;
   a processor including a coprocessor and an instruction queue, wherein the instruction queue is configured to store program instructions retrieved from the memory;
   an activity monitoring unit configured to:
      switch the coprocessor from operating in a first power mode to operate in a second power mode responsive a determination that the instruction queue includes no instructions to be executed by the coprocessor;
      wherein power consumed by the coprocessor when operating in the second power mode is less than power consumed by the coprocessor when operating in the first power mode; and
      switch the coprocessor to operate in the first power mode responsive to a determination that the instruction queue includes at least one instruction to be executed by the coprocessor;
   wherein the coprocessor includes a plurality of functional blocks, wherein a first proper subset of the plurality of functional blocks is coupled to a first power supply, and wherein a second proper subset of the plurality of functional blocks is coupled to a second power supply, wherein the second proper subset is different than the first proper subset.

4. The system of claim 3, wherein to switch the coprocessor operating in the second power mode to operate in the first power mode, the activity monitoring unit is further configured to increase a voltage level of the first power supply, and increase a voltage level of the second power supply responsive to the increase of the voltage level of the first power supply.

5. The system of claim 1, wherein in the first predetermined period of time is dependent upon one or more of the stored program instructions.

6. A method for managing power in a processor, comprising:
   switching a coprocessor from operating in a first power mode to operating in a second power mode responsive to a determination that an instruction queue includes no instructions to be executed by the coprocessor, wherein switching the coprocessor from operating in the first power mode to operating in the second power mode, comprises switching the coprocessor from operating in the first power mode to operating in the second power mode responsive to a determination that the instruction queue includes no instructions to be executed by the coprocessor for a first predetermined amount of time, and wherein power consumed by the coprocessor when operating in the second power mode is less than power consumed by the coprocessor when operating in the first power mode;
   switching the coprocessor to operate in the first power mode responsive to a determination that the instruction queue includes an instruction to be executed by the coprocessor; and switching the coprocessor from operating in the second power mode to operating in a third power mode responsive to a determination that the instruction queue includes no instructions to be executed by the coprocessor for a second predetermined amount of time since the coprocessor switched to operating in second power mode, wherein power consumed by the coprocessor when operating in the third power mode is less than power consumed by the coprocessor when operating in the second power mode.

7. The method of claim 6, wherein switching the coprocessor from operating in the first power mode to operating in the second power mode comprises reducing a voltage level of a first power supply coupled to a first set of functional blocks included in the coprocessor and reducing a voltage level of a second power supply coupled to a second set of functional blocks included in the coprocessor, wherein the second set of functional blocks is different from the first set of functional blocks.

8. The method of claim 7, wherein switching the coprocessor to operate in the first power mode comprises increasing the voltage level of the first power supply, and increasing the voltage level of the second power supply responsive to the increasing of the voltage level of the first power supply.

9. The method of claim 6, wherein switching the coprocessor from operating in the second power mode to operating in the third power mode comprises reducing a voltage level of a first power supply coupled to a first set of functional blocks included in the coprocessor and reducing a voltage level of a second power supply coupled to a second set of functional blocks included in the coprocessor.

10. The method of claim 6, further comprising setting the first predetermined amount of time and the second predetermined amount of time dependent upon an application being executed by the processor.

11. An apparatus, comprising:
a processor including a coprocessor;
an instruction queue coupled to the processor, wherein the instruction queue is configured to store instructions for the processor and the coprocessor; and
a system monitor unit coupled to the processor, wherein the system monitor unit is configured to:
switch the coprocessor from operating in a first power mode to operate in a second power mode responsive to a determination that the instruction queue includes no instructions to be executed by the coprocessor;
wherein power consumed by the coprocessor when operating in the second power mode is less than power consumed by the coprocessor when operating in the first power mode; and
switch the coprocessor to operate in the first power mode responsive to a determination that the instruction queue includes at least one instruction to be executed by the coprocessor;
wherein to switch the coprocessor from operating in the first power mode to operate in the second power mode, the system monitor unit is further configured to switch the coprocessor from operating in the first power mode to operate in the second power mode responsive to a determination that the instruction queue includes no instructions to be executed by the coprocessor for a first predetermined amount of time; and
wherein the system monitor unit is further configured to switch the coprocessor from operating in the second power mode to operate in a third power mode responsive to a determination that the instruction queue includes no instructions to be executed by the coprocessor for a second predetermined amount of time after the first period of time has elapsed, wherein power consumed by the coprocessor when operating in the third power mode is less than power consumed by the coprocessor when operating in the second power mode.

12. The apparatus of claim 11, wherein to switch the coprocessor from operating in the first power mode to operate in the second power mode, the system monitor unit is further configured to reduce a voltage level of a power supply coupled to the coprocessor.

13. The apparatus of claim 11, wherein the coprocessor includes a plurality of functional blocks, wherein a first proper subset of the plurality of functional blocks is coupled to a first power supply, and wherein a second proper subset of the plurality of functional blocks is coupled to a second power supply, wherein the second proper subset is different than the first proper subset.

14. The apparatus of claim 13, wherein to switch the coprocessor from operating in the second power mode to operate in the first power mode, the system monitor unit is further configured to increase a voltage level of the first power supply, and increase a voltage level of the second power supply responsive to the increase of the voltage level of the first power supply.

* * * * *